United States Patent
Watanabe et al.

(10) Patent No.: US 7,157,396 B2
(45) Date of Patent: Jan. 2, 2007

(54) DIELECTRIC CERAMIC COMPOSITION AND METHOD OF PRODUCTION AND ELECTRONIC DEVICE OF THE SAME

(75) Inventors: Yasuo Watanabe, Chuo-ku (JP); Kenta Endoh, Nikaho-machi (JP); Wataru Takahara, Chuo-ku (JP)

(73) Assignee: TDK Corporation, Tokyo (JP)

( * ) Notice: Subject to any disclaimer, the term of this patent is extended or adjusted under 35 U.S.C. 154(b) by 151 days.

(21) Appl. No.: 10/992,708

(22) Filed: Nov. 22, 2004

(65) Prior Publication Data

US 2005/0128683 A1   Jun. 16, 2005

(30) Foreign Application Priority Data

Nov. 28, 2003   (JP) .............................. 2003-399008

(51) Int. Cl.
*C04B 35/465* (2006.01)
(52) U.S. Cl. ............... 501/135; 501/136; 501/137; 501/138; 501/139; 361/321.4
(58) Field of Classification Search ................ 501/135, 501/136, 137, 138, 139
See application file for complete search history.

(56) References Cited

U.S. PATENT DOCUMENTS

| | | | | |
|---|---|---|---|---|
| 6,344,427 B1 * | 2/2002 | Komatsu et al. | ............ | 501/138 |
| 6,544,916 B1 * | 4/2003 | Sato et al. | ............ | 501/137 |
| 6,559,084 B1 * | 5/2003 | Fujikawa et al. | ............ | 501/139 |
| 6,962,888 B1 * | 11/2005 | Watanabe et al. | ............ | 501/136 |

FOREIGN PATENT DOCUMENTS

| | | | |
|---|---|---|---|
| JP | 57-037081 B | | 8/1982 |
| JP | 60-131708 A | | 7/1985 |
| JP | 63-126117 A | | 5/1988 |
| JP | 08-008137 A | | 1/1996 |
| JP | 2997236 B2 | | 12/1998 |
| JP | 11-224827 A | | 8/1999 |
| JP | 2000-223349 A | | 8/2000 |
| JP | 2002-097772 A | | 4/2001 |
| JP | 2002-080278 A | | 3/2002 |
| JP | 2002-080279 A | | 3/2002 |
| JP | 2003-146748 A | | 5/2003 |
| WO | WO 02/00568 A1 | | 1/2002 |

\* cited by examiner

*Primary Examiner*—Karl Group
(74) *Attorney, Agent, or Firm*—Oliff & Berridge, PLC (57) ABSTRACT

A method of production of a reduction resistant dielectric ceramic composition having a superior low frequency dielectric characteristic and further improved in accelerated lifetime of insulation resistance, specifically a method of production of a dielectric ceramic composition containing a main component including a dielectric oxide of a specific composition, a first subcomponent including a V oxide, a second subcomponent containing an Al oxide, a third subcomponent containing an Mn oxide, and a fourth subcomponent containing a specific sintering aid in a specific ratio, including a step of mixing at least part of the materials of the subcomponents excluding one or both of at least the material of the third subcomponent and material of the fourth subcomponent with the starting materials prepared for obtaining the material of the main component to prepare the pre-reaction material, a step of causing the prepared pre-reaction material to react to obtain a reacted material, and a step of mixing the materials of the subcomponents excluded when preparing the pre-reaction material with the obtained reacted material to obtain a dielectric ceramic composition.

21 Claims, 3 Drawing Sheets

PRE-ADDITION

FIG. 3

POST-ADDITION

DIELECTRIC CERAMIC COMPOSITION AND METHOD OF PRODUCTION AND ELECTRONIC DEVICE OF THE SAME

BACKGROUND OF THE INVENTION

1. Field of the Invention

The present invention relates to a dielectric composition able to be used for example for dielectric layers of a multilayer ceramic capacitor and a method of production of the same and to an electronic device using this dielectric ceramic composition for dielectric layers.

2. Description of the Related Art

In recent years, as dielectric ceramic compositions for forming multilayer ceramic capacitors etc., an example of an electronic device, various proposals have been made for the use of inexpensive base metals (for example, nickel, copper, etc.) for the materials for the internal electrodes (see Japanese Patent Publication (A) No. 11-224827, Japanese Patent Publication (A) No. 60-131708, Japanese Patent Publication (B) No. 57-37081, and Japanese Patent Publication (A) No. 63-126117).

However, in each of these dielectric ceramic compositions, the low frequency dielectric characteristic after firing deteriorated (change in capacity, dielectric loss) or the accelerated lifetime of the insulation resistance after firing became shorter. Therefore, when using a dielectric ceramic composition to produce a multilayer ceramic capacitor having nickel or other base metal internal electrodes, the reliability of the multilayer ceramic capacitor obtained tended to fall.

Therefore, various proposals have been made to maintain the superior low temperature dielectric characteristic, increase the accelerated lifetime of the insulation resistance of dielectric ceramic compositions, and improve the reliability of multilayer ceramic capacitors using such dielectric ceramic compositions (for example, see Japanese Patent Publication (A) No. 2002-80278, Japanese Patent No. 2997236, and WO02/00568).

Japanese Patent Publication (A) No. 2002-80278 discloses a dielectric ceramic composition having a dielectric oxide of a composition expressed by $(Ca_{1-x}Sr_x)_m \cdot (Zr_{1-y}Ti_y)O_3$ (where, $0.995 \leq m < 1.08$, $0 \leq x \leq 1.00$, $0.8 \leq y \leq 1.00$) as its main component and containing, with respect to 100 moles of the main component, 0.01 to 2 moles (however, excluding 2 moles) of at least one type of oxide of V, Nb, W, Ta, and Mo, less than 4 moles of $MnO_2$, and less than 15 moles of at least one compound of $SiO_2$, MO (where M is at least one type of element selected from Ba, Ca, Sr and Mg), $Li_2O$, and $B_2O_3$.

Japanese Patent No. 2997236 discloses a dielectric ceramic composition having a dielectric oxide of a composition expressed by $(Ca_{1-x}Sr_x)_m \cdot (Zr_{1-y}Ti_y)O_3$ (where, $0.75 \leq m \leq 1.04$, $0 \leq x \leq 1.00$, $0 \leq y \leq 0.1$) as its main component and containing, with respect to 100 moles of the main component, at least one type of oxide of Nb, W, Ta, and Mo, but not V, 0.1 to 10 moles of $Al_2O_3$, 0.2 to 5 moles of $MnO_2$, and 0.5 to 15 moles of a compound oxide of Ba, Ca, and Si.

WO02/00568 discloses a dielectric ceramic composition having a dielectric oxide of a composition expressed by $(Ca_{1-x}Sr_x)_m \cdot (Zr_{1-y}Ti_y)O_3$ (where, $0.8 \leq m < 1.3$, $0 \leq x \leq 1.00$, $0.1 \leq y \leq 0.8$) as its main component and containing, with respect to 100 moles of the main component, 0.01 to 5 moles of at least one type of oxide of V, Nb, W, Tag and Mo, 0.2 to 5 moles of $MnO_2$, and less than 15 moles of at least one compound of $SiO_2$, MO (where X is at least one type of element selected from Ba, Ca, Sr, and Mg), $Li_2O$, and $B_2O_3$.

However, even with the dielectric ceramic compositions described in Japanese Patent Publication (A) No. 2002-80278, Japanese Patent No. 2997236, and WO02/00568, a sufficient accelerated lifetime of insulation resistance is sometimes still not obtained. As a result, when using a dielectric ceramic composition to produce a multilayer ceramic capacitor having nickel or other base metal internal electrodes, it is not possible to improve the reliability of a multilayer ceramic capacitor.

Note that this type of dielectric ceramic composition, as explained above, generally is comprised of a main component comprised of a CaSrZrTi-based or other dielectric oxide and subcomponents comprised of various oxides.

In the past, for the purpose of improving the various characteristics of dielectric ceramic compositions, the timing of adding the above subcomponents in the process of production of a dielectric ceramic composition has been studied. Explaining the timing of addition, it may be roughly divided into so-called "pre-addition" and "post-addition". Here, "pre-addition" is the method of weighing and mixing starting materials for obtaining the dielectric oxide for forming the main component (if taking as an example Japanese Patent Publication (A) No. 2002-80278, Japanese Patent No. 2997236, and WO02/00568, the dielectric oxides expressed by $(Ca_{1-x}Sr_x)_m \cdot (Zr_{1-y}Ti_y)O_3$ after firing (for example, $CaCO_3$, $SrCO_3$, $TiO_2$, and $ZrO_2$) and the various compounds for forming the subcomponents (if taking as an example Japanese Patent Publication (A) No. 2002-80278, at least one type of oxide of V, Nb, W, Ta; and Mo, $MnCO_3$, $SiO_2$, etc.) after firing in accordance with the final composition targeted, calcining the result to obtain a calcined material, then firing the dielectric material formed by only this. The "post-addition" is the method of weighing and mixing starting materials for obtaining the dielectric oxide for forming the main component after firing in accordance with the final composition targeted, calcining the result to obtain the calcined material, then adding the various compounds for forming the subcomponents after firing and firing the dielectric material formed by the mixture of the calcined material and various compounds obtained.

In the past, it had been thought that the compositions or weights of the subcomponents added to the main component themselves affected the characteristics of the dielectric ceramic composition. The timing of addition of the subcomponents had not been particularly considered. Therefore, the method based on the simplest form of pre-addition had been adopted (see Japanese Patent Publication (A) No. 8-8137). After this, the timing of addition of the subcomponents came to be considered as an important factor together with the compositions and amounts of the subcomponents added. In recent years, methods based on post-addition were proposed for several compositions (see Japanese Patent Publication (A) No. 2001-97772 and Japanese Patent Publication (A) No. 2003-146748). Further, the method of mixing part of the subcomponents when producing the main component and adding the remaining subcomponents to the obtained calcined material has also been proposed (see Japanese Patent Publication (A) No. 2000-223349 and Japanese Patent Publication (A) No. 2002-80279).

However, whether the method based on pre-addition of the subcomponents is suitable or the method based on post-addition of all or part of the subcomponents is suitable has to be confirmed by experiment for each target composition. Even a person skilled in the art would find it difficult to determine which method is suitable for systems of different compositions without actual confirming experiments.

SUMMARY OF THE INVENTION

An object of the present invention is to provide a method for producing a reduction resistant dielectric ceramic composition having a superior low frequency dielectric characteristic and improved more in accelerated lifetime of the insulation resistance, a dielectric ceramic composition obtained by this method, and an electronic device such as a chip capacitor including the dielectric ceramic composition and raised more in reliability.

To achieve the above object, according to the present invention, there is provided a method of production of a dielectric ceramic composition, the method of production of a dielectric ceramic composition having:

a main component including a dielectric oxide expressed by a composition formula $\{(Ca_{1-x}Me_x)O\}_m \cdot (Zr_{1-y}Ti_y)O_2$, wherein the symbol Me showing the name of the element in the composition is at least one of Sr, Mg, and Ba, and the symbols m, x, and y showing the molar ratio of the composition in the composition formula are $0.8 \leq m \leq 1.3$, $0 \leq x \leq 1.00$, $0 \leq y \leq 1.00$, a first subcomponent including a V oxide, a second subcomponent including an Al oxide, a third subcomponent including an Mn oxide, and a fourth subcomponent having $SiO_2$ as a main component and including an oxide including at least one type selected from MO (where M is at least one type of element selected from Ba, Ca, Sr, and Mg), $Li_2O$, and $B_2O_3$, a ratio of the subcomponents with respect to 100 moles of the main component being:

first subcomponent: 0 mole<first subcomponent<7 moles (however, value converting V oxide to $V_2O_5$), second subcomponent: 0 mole<second subcomponent<15 moles (however, value converting Al oxide to $Al_2O_3$), third subcomponent: 0 mole<third subcomponent<5 moles (however, value converting Mn oxide to Mn element), fourth subcomponent: 0 mole<fourth subcomponent<20 moles (however, value converted to oxide), the method of production of a dielectric ceramic composition having:

a step of mixing at least part of other materials of subcomponents excluding at least one or both of the material of the third subcomponent and the material of the fourth subcomponent with starting materials prepared for obtaining the material of the main component so as to prepare a pro-reaction material, a step of causing the prepared pre-reaction material to react so as to obtain the reacted material, and a step of mixing with the obtained reacted material the materials of the subcomponents excluded when preparing the pre-reaction material to obtain a dielectric ceramic composition.

As the materials of the subcomponents excluded when preparing the pre-reaction material, the action is greatest in the order of the materials of the third>fourth>first to second subcomponents. In the present intention, the materials or the subcomponents excluded when preparing the pre-reaction material are at least one or both of the materials of the third to fourth subcomponents. Preferably, they are both of the materials of the third to fourth subcomponents, more particularly all of the materials of the first to fourth subcomponents.

The materials of the subcomponents included in the pre-reaction material are at least one of the materials selected from the materials of the first, second, and fourth subcomponents or at least one of the materials selected from the materials of the first to third subcomponents.

Note that the one or both of the materials of the third to fourth subcomponents excluded at the pre-reaction powder are preferably all of the final composition, but may be part as well.

The fourth subcomponent preferably includes a compound oxide expressed by the composition formula $\{(Ba_z, Ca_{1-z})O\}_v SiO_2$ where the symbols z and v showing the molar ratio in the composition formula are in the relation of $0 \leq z \leq 1$ and $0.5 \leq v \leq 4.0$.

In the present invention, as the "method for causing the pre-reaction material to react", the solid phase method (for example, the calcining method) or the liquid phase method may be mentioned. The "solid phase method" is the method of weighing and mixing starting materials prepared for obtaining the material of the main component, for example, $SrCO_3$, $CaCO_3$, $TiO_2$, and $ZrO_2$ together with materials of the subcomponents in accordance with need and calcining and pulverizing the result to obtain the calcined material. As the liquid phase method, the oxalate method, hydrothermal synthesis method, sol gel method, etc. may be mentioned. Among these, it is preferable to use reacted materials obtained by the solid phase method.

Preferably, the method has the step of firing the obtained dielectric ceramic composition at 1000 to 1400° C. The dielectric particles forming the dielectric ceramic composition obtained by the present invention have a mean crystal grain size of not more than 1 μm. The mean crystal grain size is calculated for example by the cord method. The inventors discovered that by controlling the mean crystal grain size of the dielectric particles forming the obtained dielectric ceramic composition, it is possible to improve the accelerated lifetime of the insulation resistance and as a result possible to improve the reliability of multilayer ceramic capacitors and other electronic devices produced using these dielectric ceramic composition.

That is, according to the present invention, a dielectric ceramic composition having dielectric particles having a mean crystal grain size of not more than 1 μm obtained by any of the above methods is provided.

The electronic device according to the present invention is not particularly limited so long as it has dielectric layers and for example may be a multilayer ceramic capacitor having a device body obtained by alternately stacking for example dielectric layers and internal electrode layers. In the present invention, the dielectric layers are comprised of any of the above dielectric ceramic compositions. The conductive material included in the internal electrode layers is not particularly limited, but for example is comprised of Ni or an Ni alloy or other base metal etc. as a main component.

Note that in the following explanation, the "material of the main component" will sometimes be abbreviated as the "main component material" and the "material of the . . . subcomponent" will sometimes be abbreviated as the " . . . subcomponent material".

The inventors engaged in intensive studies to better improve the accelerated lifetime of the insulation resistance (=high temperature load lifetime, hereinafter in the explanation sometimes also referred to merely as "lifetime") of a reduction resistant dielectric ceramic composition. As a result, they discovered that dielectric ceramic compositions containing at least a V oxide, Al oxide, Mn oxide, and a specific sintering aid in a specific ratio can greatly improve the lifetime of dielectric oxides of specific compositions compared with dielectric ceramic compositions of conventional compositions. The reasons for this effect arising are not necessarily clear, but it may be that it arises due to the synergistic effects of at least a V oxide and Al oxide. Further, they discovered that it is possible to greatly improve the reliability of electronic devices obtained when using dielectric ceramic compositions greatly improved in this lifetime and therefore previously filed Japanese Patent Application No. 2003-38778.

The inventors engaged in further studies and reached the method suited to the production of a dielectric ceramic composition of this composition.

The method of production of a dielectric ceramic composition of the present invention comprises mixing the starting materials prepared for obtaining a main component material of a specific composition and at least part of the materials of other subcomponents excluding one or both of the third subcomponent material and fourth subcomponent material (most preferably all of the first to fourth subcomponent materials) (most preferably mixes only the starting materials prepared for obtaining the main component material of a specific composition) to obtain the pre-reaction material, causing the pre-reaction material to react to obtain the reacted material, then mixing the subcomponent materials excluding those when preparing the pre-reaction material (most preferably all of the first to fourth subcomponent materials) and using the obtained dielectric ceramic composition material to produce the dielectric ceramic composition. That is, the method of the present invention is characterized in the point of employing the method of so-called post-addition in the process of production of a dielectric ceramic composition of a specific composition.

The dielectric particles forming the dielectric ceramic composition obtained by this method are finely controlled to mean crystal grain sizes of not more than 1 μm. The inventors believe that making the mean crystal grain size of the dielectric particles finer in this way contributes to improvement of the lifetime. As a result, the reliability of the obtained electronic device is greatly improved.

That is, according to the present invention, it is possible to provide a method for producing a reduction resistant dielectric ceramic composition having a superior low frequency dielectric characteristic (for example, a dielectric loss of not more than 0.01% at 160° C. and 100 Hz) and further improved in accelerated lifetime of insulation resistance and a dielectric ceramic composition obtained by this method.

Further, the chip capacitor or other electronic device according to the present invention has dielectric layers formed by a dielectric ceramic composition produced by the method of the present invention, so has a superior capacity-temperature characteristic, is improved in accelerated lifetime of insulation resistance (high temperature load lifetime) while suppressing the low frequency dielectric dispersion, and as a result is greatly improved in reliability of the electronic device.

The electronic devices are not particularly limited, but ceramic capacitors, multilayer ceramic capacitors, chip varistors, and other surface mounted (SMD) chip type electronic devices may be mentioned.

BRIEF DESCRIPTION OF THE DRAWINGS

These and other objects and features of the present invention will be explained in further detail with reference to the attached drawings, wherein.

DESCRIPTION OF THE PREFERRED EMBODIMENTS

Figure 1:
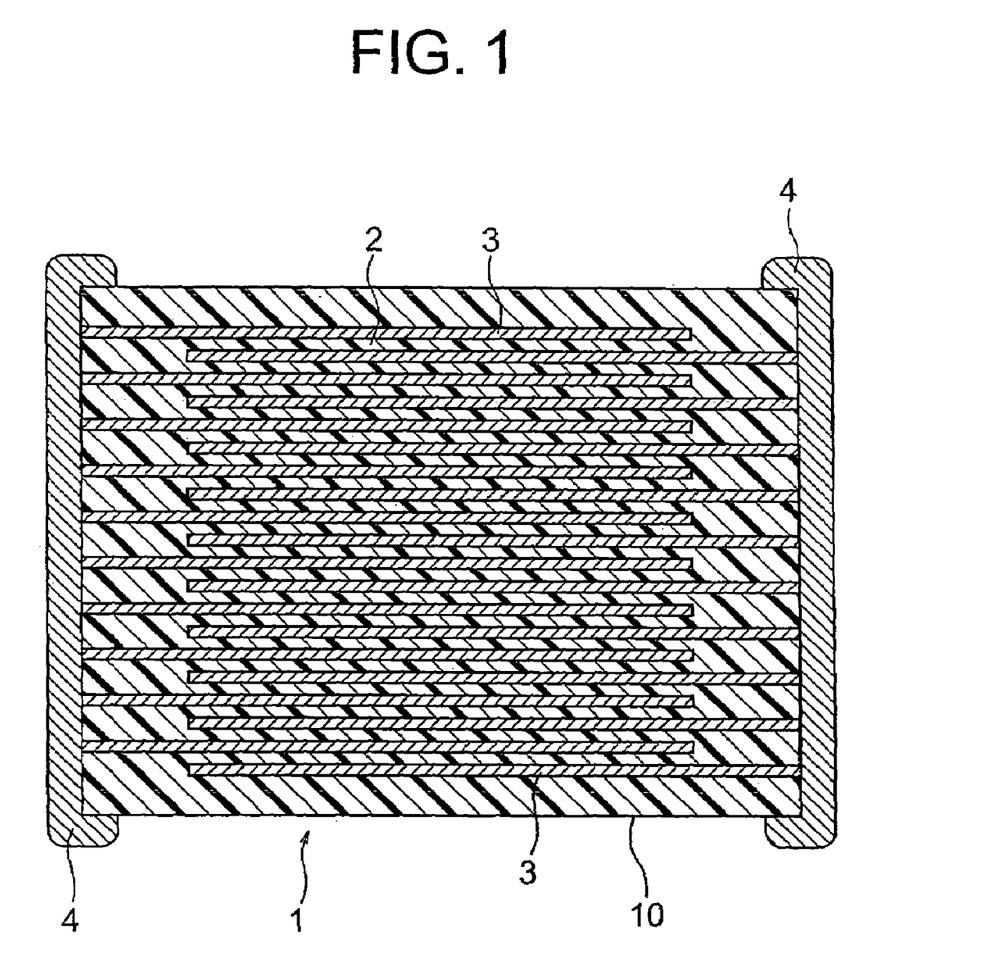
FIG. 1 is a sectional view of a multilayer ceramic capacitor according to an embodiment of the present invention.

Below, the present invention will be explained based on the embodiments shown in the figure. As shown in FIG. 1, a multilayer ceramic capacitor 1 according to an embodiment of the present invention has a capacitor device body 10 of a configuration of dielectric layers 2 and internal electrode layers 3 stacked alternately. At the two ends of the capacitor device body 10 are formed a pair of external electrodes 4 conductive with the internal electrode layers 3 alternately arranged inside the device body 10. The shape of the capacitor device body 10 is not particularly limited, but normally is made a rectangular parallelopiped. Further, the dimensions are not particularly limited and may be made suitable dimensions in accordance with the application. Usually, however, they are (0.4 to 5.6 mm)×(0.2 to 5.0 mm)×(0.2 to 1.9 mm).

The internal electrode layers 3 are stacked so that end faces thereof alternately protrude out to the surfaces of the two opposing ends of the capacitor device body 10. The pair of external electrodes 4 are formed at the two ends of the capacitor device body 10 and are connected to the exposed end faces of the alternately arranged internal electrode layers 3 to form a capacitor circuit.

The dielectric layers 2 contain the dielectric ceramic composition produced by the method of the present invention. This dielectric ceramic composition has a main component including a dielectric oxide expressed by a composition formula $\{(Ca_{1-x}Me_x)O\}_m \cdot (Zr_{1-y}Ti_y)O_2$ and at least a first subcomponent including a V oxide, a second subcomponent including an Al oxide, a third subcomponent including an Mn oxide, and a fourth subcomponent having $SiO_2$ as a main component and including an oxide including at least one type selected from Mo (where M is at least one type of element selected from Ba, Ca, Sr, and Mg), $Li_2O$, and $B_2O_3$. At this time, the amount of oxygen (O) may be somewhat deviated from the stoichiometric composition of the above formula.

In the formula, $0 \leq x \leq 1.00$. x indicates the number of atoms of the symbol Me (where Me is at least one of Sr, Mg, and Ba. In particular, Sr is preferable). By changing the ratio of x, that is, the symbol Me/Ca, it becomes possible to shift the phase transition point of the crystal in any way. Therefore, it is possible to control the capacity-temperature coefficient or specific dielectric constant in any way. In the present invention, the ratio of Ca and the symbol Me may be any ratio. Just one alone may also be included.

In the formula, $0 \leq y \leq 1.00$, preferably $0 \leq y \leq 0.8$. y indicates the number of Ti atoms. By replacing the $ZrO_2$ more difficult to reduce compared with $TiO_2$, the reduction resistance is further increased in trend.

In the formula, $0.8 \leq m \leq 1.3$, preferably $0.970 \leq m \leq 1.030$. By making m 0.8 or more, formation of a semiconductor is prevented from occurring due to firing in a reducing atmosphere. By making m not more than 1.3, it is possible to obtain a dense sintered body even without making the firing temperature higher.

The first subcomponent functions to improve the high temperature load lifetime.

The second subcomponent functions to lower the firing temperature and raise the high temperature load lifetime.

The ratio of the first subcomponent to 100 moles of the main component is, converted to $V_2O_5$, 0 mole$\leq$first subcomponent$\leq$7 moles, preferably 0.01 mole$\leq$first subcomponent$\leq$5 moles. The ratio of the second subcomponent to 100 moles of the main component is, converted to $Al_2O_3$, 0 mole$\leq$second subcomponent$\leq$15 moles, preferably 0.01 mole$\leq$5 second subcomponent<10 moles. By including the first subcomponent and second subcomponent in predetermined amounts, low temperature firing becomes possible without deteriorating the dielectric characteristic in the range of y of the main component of preferably $0.1\leq y\leq 0.8$, the lifetime can be greatly increased even if making the dielectric layers thinner, and in turn the reliability as a capacitor can be greatly improved.

Note that part of the V oxide included in the first subcomponent may be substituted by oxides of Group. V elements such as Nb and Ta and oxides of Group IV elements of Cr, Mo, and W.

The third subcomponent has the effect of promoting sintering and the effect of improving lifetime and also has the effect of lowering the defect rate of the initial insulation resistance when making the dielectric layers 2 thin to for example 4 µm or so.

The ratio of the third subcomponent with respect to 100 moles of the main component is, converted to Mn element in the oxide, preferably 0 mole<third subcomponent<5 moles, preferably 0.1 mole$\leq$third subcomponent$\leq$4 moles. If the amount of the third subcomponent added is too great, the initial insulation resistance cannot be obtained too well. If the amount of addition of the third subcomponent is in the range of 0 mole<third subcomponent<5 molest this contributes to improvement of the lifetime and further can reduce the occurrence of an initial IR defect rate.

The fourth subcomponent acts mainly as a sintering aid, but also has the effect of improving the defect rate of the initial insulation resistance (IR) when making the dielectric layers 2 thinner. Preferably, the fourth subcomponent includes a compound oxide expressed by the composition formula $\{(Ba_z, Ca_{1-z})O\}_v SiO_2$ (hereinafter sometimes also referred to as "BCG"). The compound oxide expressed by $\{(Ba_z, Ca_{1-z})O\}_v SiO_2$ has a low melting point, so is good in reactivity with respect to the main component. In the compound formula $\{(Ba_z, Ca_{1-z})O\}_v SiO_2$ of a preferable embodiment of the fourth subcomponent, the symbol v showing the molar ratio in the composition formula is preferably $0.5\leq v\leq 4.0$, more preferably $0.5\leq v\leq 2.0$. If v is too small, that is, if $SiO_2$ is too large, it ends up reacting with the main component and deteriorates the dielectric characteristic. On the other hand, if, v is too large, the melting point becomes higher and the sinterability is degraded, so this is not preferred. Note that the symbol z showing the molar ratio of Ba and Ca may be any ratio ($0\leq z\leq 1$). It is also possible to include only one. Preferably $0.3\leq z\leq 0.7$.

The ratio of the fourth subcomponent to 100 moles of the main component is, converted to oxide (or compound oxides), preferably 0 mole<fourth subcomponent<20 moles, more preferably 0.1 mole$\leq$fourth subcomponents$\leq$15 moles. Adding the fourth subcomponent in even a small amount is effective in reducing the occurrence of the initial IR defect rate. Making the amount of addition less than 20 moles suppresses the drop in the specific dielectric constant and can secure sufficient capacity.

In this embodiment, the dielectric ceramic composition may further include a fifth subcomponent including an oxide of R (where R is at least one element of Sc, Y, La, Ce, P Nd, Pm, Sm, tu, Gd, Tb, Dy, Ho, Er, Tm, Yb, and Lu).

The number of layers, thickness, and other conditions of the dielectric layers 2 may be suitably determined in accordance with the object or application. Further, the dielectric layers 2 are comprised of grains (dielectric particles) and grain boundaries. In the present embodiment, the mean particle size of the grains of the dielectric layers 2 (mean crystal grain size) is made not more than 1 µm, preferably not more than 0.8 µm, more preferably not more than 0.7 µm. Making the mean crystal grain diameter finer can contribute to an improvement of the accelerated lifetime of the insulation resistance. The grain boundary is normally comprised of an oxide of a material forming the dielectric material or internal electrode material, an oxide of a separately added material, or an oxide of a material entering as an impurity during the process and is normally a glass or glassy.

The conductive material contained in the internal electrode layer 3 is not particularly limited, but the material of the dielectric layers 2 has a reduction resistance, so it is possible to use a base metal. As the base metal used as the conductive material, Ni or an Ni alloy is preferable. As the Ni alloy, an alloy of at least one element selected from Mn, Cr, Co, and Al and Ni is preferable. The content of Ni in the alloy is preferably at least 95 wt %. Note that the Ni or Ni alloy may also include various trace components such as P, Fe, and Mg in amounts of not more than 0.1 wt % or so. The thickness of the internal electrode layers may be suitably determined in accordance with the application etc., but normally is 0.3 to 3 µm, particularly 0.5 to 2 µm or so.

The conductive material included in the external electrodes 4 is not particularly limited, but normally Cu or a Cu alloy or Ni or an Ni alloy etc. is used. Note that Ag or an Ag—Pd alloy etc. may of course also be used. Note that in this embodiment, inexpensive Ni or Cu or alloys of the same are used. The thickness of the external electrodes may be suitably determined in accordance with application etc., but normally is preferably 5 to 50 µm or so.

The multilayer ceramic capacitor using the dielectric ceramic composition of the present invention is produced by preparing a green chip using the usual printing method or sheet method which uses pastes, firing the green chip, then printing or transferring the external electrodes and firing. Below, the method of production will be explained in detail.

First, the dielectric layer paste, internal electrode paste, and external electrode paste are produced.

When producing the dielectric layer paste, first the dielectric ceramic composition material included in this is prepared. The dielectric ceramic composition material includes the main component material and the first to fourth and other subcomponent materials.

As the main component material, a material expressed by composition formula $\{(Ca_{1-x}Me_x)O\}_m \cdot (Zr_{1-y}Ti_y)O_2$ may be used.

As the first subcomponent material, a V oxide and/or a compound forming a V oxide after firing may be used. As the second subcomponent material, an Al oxide and/or a compound forming an Al oxide after firing may be used. As the third subcomponent material, an Mn oxide and/or a compound forming an Mn oxide after firing may be used. As the fourth subcomponent material, $SiO_2$, BaO, CaO, SrO, MgO, $Li_2O$, $B_2O_3$, and/or compounds forming these oxides after firing may be used.

In this embodiment, the above main component material is produced once by the solid phase method, liquid phase method, etc. and at least one or both of the third subcomponent material and fourth subcomponent material is preferably further mixed with the first subcomponent material and second subcomponent material-so as to obtain the dielectric ceramic composition material (post-addition). By using a dielectric ceramic composition material obtained by adding one or both of at least the third subcomponent and fourth subcomponent after producing the main component material, it is possible to reduce the mean crystal grain size of the dielectric particles forming the dielectric ceramic composition finally obtained to not more than 1 μm and as a result possible to improve the accelerated lifetime of the insulation resistance and improve the reliability of the capacitor.

Below, an explanation will be given taking as an example the method of producing the main component material by the solid phase method (for example, the calcining method), then mixing into the main component material the first to fourth subcomponent materials to obtain the dielectric ceramic composition material.

First, predetermined amounts of the starting materials of the main component material such as $SrCO_3$, $CaCO_3$, $TiO_2$, and $ZrO_2$ are weighed, mixed, and dried to prepare the pre-calcining material.

Next, the prepared pre-calcined powder is calcined. The calcination conditions are not particularly limited, but preferably the calcination is performed under the following conditions. The rate of temperature rise is preferably 50 to 400° C./hour, more preferably 100 to 300° C./hour. The holding temperature is preferably 1000 to 1400° C. The temperature holding time is preferably 0.5 to 6 hours, more preferably 1 to 3 hours. The processing atmosphere may be any of the air, nitrogen, or a reducing atmosphere.

Next, the calcined powder (corresponding to main component material) is roughly pulverized by an alumina roll etc., then predetermined amounts of the first subcomponent material (for example, $V_2O_5$), second subcomponent material (for example, $Al_2O_3$), third subcomponent material (for example, $MnCO_3$), and fourth subcomponent material (for example, $(Ba_{0.6}Ca_{0.4})SiO_3$) are weighed and added and, if necessary, other subcomponent materials are also added, to obtain the final composition. After this, the mixed powder is mixed if necessary by a ball mill etc. and dried to obtain the dielectric ceramic composition material (powder).

Next, the dielectric ceramic composition material is made into a coating to prepare the dielectric layer paste. The dielectric layer paste may be an organic-based coating obtained by kneading the dielectric ceramic composition material and organic vehicle and may be a water-soluble coating.

As the dielectric ceramic composition material, it is possible to use the above oxides or mixtures or compound oxides of the same, but it is also possible to suitably select and mix for use various compounds which become the above oxides or compound oxides by firing, for example, carbonates, oxalates, nitrates, and organometallic compounds. The contents of the compounds in the dielectric ceramic composition should be determined so as to give a composition of the above dielectric ceramic composition after firing.

The particle size of the dielectric ceramic composition powder in the state before forming the coating is normally a mean particle size of 0.1 to 3 μm or so.

The organic vehicle is obtained by dissolving a binder in an organic solvent. The binder used for the organic vehicle is not particularly limited and may be suitably selected from normal binders such as ethyl cellulose and polyvinyl butyral. Also, the organic solvent used is not particularly limited and may be suitably selected from organic solvents such as terpineol, butyl carbitol, acetone, and toluene in accordance with a method to be used such asia printing method or a sheet method.

When making the dielectric layer paste a water-soluble coating, it is possible to knead together the water-soluble vehicle comprised of the water-soluble binder, dispersant, etc. dissolved in water and the dielectric materials. The water-soluble binder used for the water-soluble vehicle is not particularly limited and may be suitably selected from polyvinyl alcohol, cellulose, water-soluble acrylic resin, etc.

The internal electrode paste is prepared by kneading conductive materials comprised of various conductive metals or their alloys or the various oxides forming the above conductive materials after firing, organometallic compounds, resinates, etc. and the above organic vehicle.

The external electrode paste is also similarly prepared as with this internal electrode paste.

When using the printing method, the dielectric layer paste and internal electrode paste are printed in layers on a substrate made of polyethylene terephthalate etc. The substrate is cut into predetermined shapes, then the pastes are peeled off to obtain green chips. As opposed to this, when using the sheet method, the dielectric layer paste is used to form a green sheet, the internal electrode paste is printed on this, then these are stacked to form green chips.

Next, before firing, the green chips are processed to remove the binder. This processing for removing the binder may be performed under normal conditions. When using Ni or an Ni alloy or other base metal for the conductive material of the internal electrode layers, the rate of temperature rise is 5 to 300° C./hour, in particular 10 to 100° C./hour, the holding temperature is 180 to 400° C., in particular 200 to 300° C., the temperature holding time is 0.5 to 24 hours, in particular 5 to 20 hours, and the atmosphere is the air.

The atmosphere at the time of firing the green chips may be suitably determined in accordance with the type of the conductive material in the internal electrode layer paste, but when using Ni or an Ni alloy or other base metal as the conductive material, the oxygen partial pressure in the firing atmosphere is preferably $10^{-7}$ to $10^{-3}$ Pa. If the oxygen partial pressure is less than this range, the conductive material of the internal electrode layer is abnormally sintered and sometimes ends up breaking. Further, if the oxygen partial pressure is over this range, the internal electrode layers tend to oxidize.

The holding temperature at the time of firing is preferably 1000 to 1400° C., more preferably 1100 to 1400° C., still more preferably: 1150 to 1350° C., most preferably 1200 to 1300° C. If the holding temperature is too low, the densification becomes insufficient. If too high, breakage of the internal electrode layers, deterioration of the capacity-temperature characteristics due to dispersion of the materials forming the internal electrode layers, and reduction of the dielectric ceramic composition easily occur and the mean crystal grain size of the dielectric particles tends to become larger.

The conditions other than the above are preferably selected from the following range: rate of temperature rise: 50 to 500° C./hour, in particular 200 to 300° C./hour, temperature holding time: 0.5 to 8 hours, in particular 1 to 3 hours, cooling rate: 50 to 500° C./hour, in particular 200 to 300° C./hour.

Note that the firing atmosphere is preferably made a reducing atmosphere. As the reducing atmosphere, for example, it is preferable to moisten and use a mixed gas of $N_2$ and $H_2$.

When firing in a reducing atmosphere, it is preferable to anneal the sintered body after firing. The annealing is treatment for reoxidizing the dielectric layer. Since it is possible to make the IR lifetime remarkably longer by this, the reliability is improved.

The oxygen partial pressure in an annealing atmosphere is at least $10^{-4}$ Pa, preferably at least $10^{-1}$ Pa, particularly preferably 1 to 10 Pa. If the oxygen partial pressure is less than this range, reoxidation of the dielectric layers is difficult. If over this range, the internal electrode layers tend to oxidize.

The holding temperature at the time of annealing is 1100° C. or less, particularly 500 to 1100° C. If the holding temperature is less than this range, oxidation of the dielectric layers becomes insufficient, so the IR tends to become low or the IR lifetime easily becomes shorter. On the other hand, when the holding temperature exceeds the above range, not only are the internal electrode layers oxidized and does the capacity fall, but also the internal electrode layers end up reacting with the dielectric base material and deterioration of the capacity-temperature characteristic, a drop in the IR, and a drop in the IR lifetime easily occur. Note that the annealing may also be comprised of just a temperature raising process and temperature lowering process. That is, the temperature holding time may also be made zero. In this case, the holding temperature is synonymous with the maximum temperature.

The conditions other than the above conditions are preferably selected from the following range: The temperature holding time is 0 to 20 hours, in particular 6 to 10 hours, and the cooling rate is 50 to 500° C./hour, in particular 100 to 300° C./hour. Note that the ambient gas used is preferably moistened $N_2$ gas etc.

In the above treatment for removing the binder, firing, and annealing, it is sufficient to use for example a wetter to moisten the $N_2$ gas or mixed gas etc. In this case, the water temperature is preferably 5 to 75° C.

The treatment for removing the binder, the firing, and the annealing may be performed consecutively or may be performed independently. When performing these consecutively, after the treatment for removing the binder, it is preferable not to cool, but to change the atmosphere, then raise the temperature to the holding temperature at the time of firing, perform the firing, then cool, then change the atmosphere when the holding temperature of the annealing is reached and perform the annealing. On the other hand, when performing these independently, preferably, at the time of firing, the temperature is raised to the holding temperature of the treatment for removing the binder in an $N_2$ gas or moistened $N_2$ gas atmosphere, then the atmosphere is changed and the temperature continues to be raised. Preferably, the temperature is cooled to the holding temperature at the time of annealing, then the atmosphere is changed again to $N_2$ gas or moistened $N_2$ gas atmosphere and the cooling is continued. Further, at the time of annealing, it is also possible to raise the temperature to the holding temperature in an $N_2$ gas atmosphere, then change the atmosphere or conduct the entire annealing process in a moistened $N_2$ gas atmosphere.

Next, the obtained capacitor sintered body is for example end polished by barrel polishing or sand blasting, printed or transferred with the external electrode paste, and fired to form the external electrodes 4. Further, if necessary, the surfaces of the external electrodes 4 are plated to form covering layers (pad layers).

The ceramic capacitor 1 of the embodiment produced in this way is mounted on a printed circuit board by soldering etc. and used for various electronic apparatuses.

Above, an embodiment of the present invention was explained, but the present invention is not limited to this embodiment in any way. The invention may of course be worked in various ways within the scope of the gist of the invention.

For example, in the above embodiment, a multilayer ceramic capacitor was illustrated as the electronic device according to the present invention, but the electronic device according to the present invention is not limited to a multilayer ceramic capacitor. It may be any device having dielectric layers formed by the dielectric ceramic composition of the above composition.

EXAMPLES

Next, examples further embodying the embodiment of the present invention will be given to explain the present invention in further detail. The present invention however is not limited to these examples.

Example 1

In this example, a multilayer ceramic capacitor was produced by the following procedure.

Preparation of Pastes

First, the starting materials having mean particle sizes of 0.1 to 1 μm for producing the main component material ($SrCO_3$, $CaCO_3$, $TiO_2$, $ZrO_2$) and the first to fourth subcomponent materials were prepared. In this embodiment, a carbonate (third subcomponent $MnCO_3$) was used for the material of the MnO, and oxides (first subcomponent $V_2O_5$, second subcomponent $Al_2O_3$, fourth subcomponent $(Ba_{0.6}Ca_{0.4})SiO_3$ (in the table, described as BCG)) were used for the other materials. Note that $(Ba_{0.6}Ca_{0.4})SiO_3$ were obtained by wet mixing $BaCO_3$, $CaCO_3$, and $SiO_2$ by a ball mill for 16 hours, dried, then fired at 1000 to 1300° C. in the air and further wet pulverized by a ball mill for 100 hours.

Next, a dielectric ceramic composition materials (powders) of the final compositions were obtained by pre-adding and post-adding the first to fourth subcomponent materials.

In the case of pre-addition (comparative examples), the starting materials for producing the main component material and the first to fourth subcomponent materials were weighed and mixed so that the composition after firing becomes the ratio shown in the samples of Table 1, then dried so as to prepare the pre-calcined powder. Next, the pre-calcined powder was calcined. The calcination conditions were as follows. The rate of temperature rise was 200° C./hour, the holding time was 1200° C., the temperature holding time was 2 hours, and the atmosphere was the air. Next, the material obtained by calcining was pulverized by an alumina roll to obtain the dielectric ceramic composition material (powder) of the final composition.

In the case of post-addition (examples), the starting materials for producing the main component material were weighed and mixed so that the composition after firing became the ratio shown in the samples of Table 1, then dried so as to prepare the pre-calcined powder. Next, the pre-calcined powder was calcined under the same conditions as above. Next, the material obtained by calcining was pulverized by an alumina roll to obtain the pre-calcined powder, then the amounts of $V_2O_5$ (first subcomponent material), $Al_2O_3$ (second subcomponent material), $MnCO_3$ (third subcomponent material), and BCG (fourth subcomponent material) of the amounts shown in Table 1 were added, wet mixed by a ball mill for 16 hours, then dried to obtain the dielectric ceramic composition material (powder) of the final composition.

Note that the "pre-addition" referred to in this example is the method of adding the first to fourth subcomponent materials to the starting material for producing the main component material when producing the calcined materials including the main component material. The "post-addition" is the method of producing the calcined material including the main component material, then adding the first to fourth subcomponent materials to the calcined materials.

Next, 100 parts by weight of the obtained dielectric ceramic composition material, 4.8 parts by weight of the acrylic acid, 40 parts by weight of methylene chloride, 20 parts by weight of ethyl acetate, 6 parts by weight of mineral spirits, and 4 parts by weight of acetone were mixed by a ball mill to prepare a paste and thereby obtain a dielectric layer paste.

100 parts by weight of Ni particles having a mean particle size of 0.1 to 0.8 μm, 40 parts by weight of an organic vehicle (comprised of 0.8 parts by weight of ethyl cellulose dissolved in 92 parts by weight of butyl carbitol), and 10 parts by weight of butyl carbitol were kneaded together by a triple roll to make a paste and thereby obtain an internal electrode layer paste.

100 parts by weight of Cu particles having a mean particle size of 0.5 μm, 35 parts by weight of an organic vehicle (comprised of 8 parts by weight of ethyl cellulose dissolved in 92 parts by weight of butyl carbitol), and 7 parts by weight of butyl carbitol were kneaded together to make a paste and thereby obtain an external electrode layer paste.

Fabrication of Green Chips

Next, the above dielectric layer paste was used to form on the PET film a green sheet of a thickness of 6 μm, an internal electrode layer paste was printed on this, then the green sheet was peeled off from the PET film.

Next, green sheets and protective green sheets (not printed with internal electrode layer paste) were stacked and pressed to obtain green chips. The number of sheets having internal electrodes was made 10 sheets.

Next, each green chip was cut to a predetermined size, the treated to remove the binder, fired, and annealed (heat treated) to obtain a multilayer ceramic sintered body. The treatment for removing the binder was performed at a temperature raising time of 100° C./hour, a holding temperature or 260° C., a holding time of 10 hours, and an air atmosphere. Further, the firing was performed at a rate of temperature rise of 200° C./hour, a holding temperature of 1250° C., a holding time of 2 hours, a cooling rate of 200° C./hour, and a moistened $N_2+H_2$ mixed gas atmosphere (oxygen partial pressure of $10^{-6}$ Pa). The annealing was performed under conditions of a holding temperature of 1000° C., a temperature holding time of 2 hours, a cooling rate of 200° C./hour, and a moistened $N_2$ gas atmosphere (oxygen partial pressure of $10^{-1}$ Pa). Note that a wetter was used for moistening the ambient gas at the time of firing and annealing.

Next, end faces of the multilayer ceramic sintered body was polished by sand blasting, then an external electrode paste was transferred to the end faces and the result was fired in a moistened $N_2+H_2$ atmosphere at 800° C. for 10 minutes to form external electrodes and obtain a sample of the multilayer ceramic capacitor of the configuration shown in FIG. 1. The size of the samples obtained in this way was 3.2 mm×1.6 mm×0.6 mm. There were 10 dielectric layers of thicknesses of 4 μm sandwiched between the internal electrode layers. The thickness of the internal electrode layers was 2 μm. The samples were evaluated for the following characteristics.

Specific Dielectric Constant (∈), Dielectric Loss (tan δ), and Specific Resistance (ρ)

The samples of the capacitors were measured for static capacity and dielectric loss (tan δ, unit %) at a reference temperature of 25° C. by a digital LCR meter (made by YHP, 4274A) at a frequency of 1 MHz and an input signal level (measurement voltage) of 1 Vrms. For the tan δ, each sample exhibited a value of not more than 0.01%. Further, from the obtained static capacity and electrode dimensions and distance between electrodes of the capacitor samples, the specific dielectric constant (∈, no unit) was calculated. For the specific dielectric constant ∈, each sample had a good value of at least 45. The specific resistance (ρ, unit Ω·cm) was measured using an insulation resistance meter (made by Advantest Corp., R8340A) after applying DC 50V at 25° C. for 60 seconds. For the specific resistance ρ, each sample exhibited a good value of $1×10^{12}$ Ω·cm or more. Note that the values of the specific dielectric constant ∈, specific resistance ρ, and dielectric loss tan δ were found from the mean values or the values measured using n=10 number of samples of capacitors.

Temperature Characteristic of Static Capacitance

Each sample of the capacitor was measured for static capacitance at 1 MHz and 1V using an LCR meter. It was investigated if the rate of change of the static capacitance with respect to temperature satisfied −3000 to 0 ppm/° C. in the temperature range of 20 to 85° C. when making the reference temperature 20° C. As a result, it was confirmed that each sample was satisfactory.

High Temperature Load Lifetime (Accelerated Life of Insulation Resistance)

Each sample of, the capacitor was measured for high temperature load lifetime by holding it at a state of application of a DC voltage of 60V/μm at 200° C. This high temperature load lifetime was evaluated by measuring the lifetime for 10 capacitor samples and finding the average lifetime. The results are shown in Table 1. For evaluation, the high temperature load lifetime is particularly important when making the dielectric layers thinner. The time until the resistance falls one order from the start of application of voltage is defined as the lifetime.

Measurement of Mean Crystal Grain Size

Figure 2:
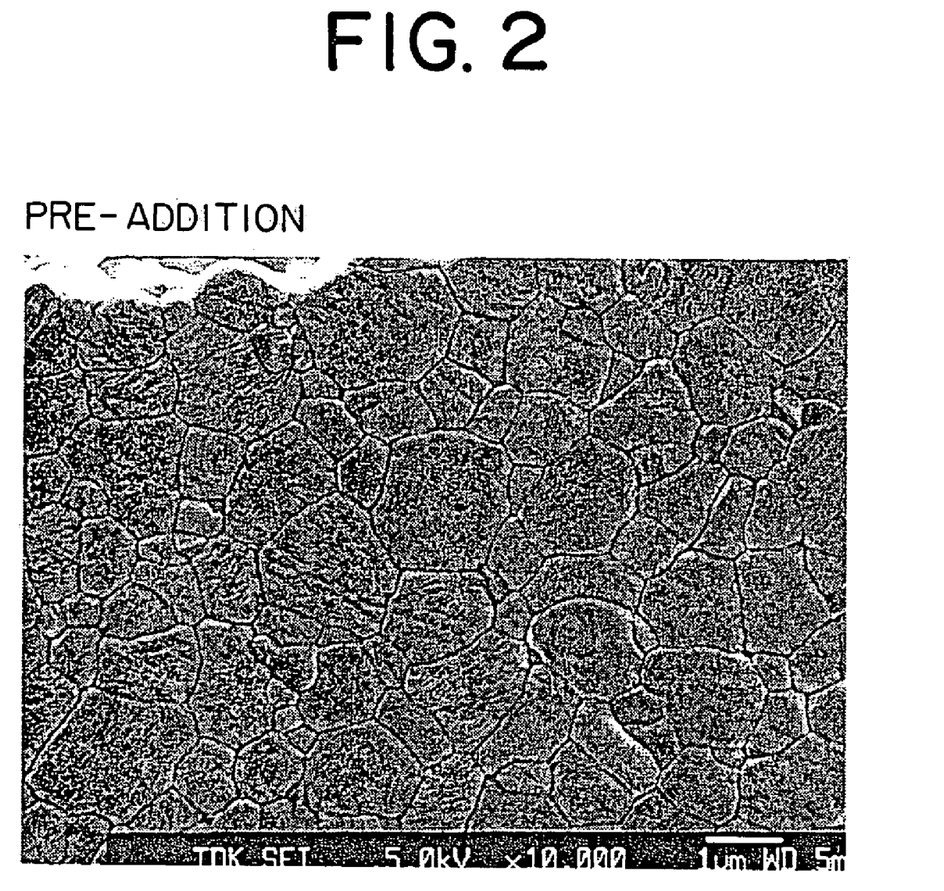
FIG. 2 is an SEM photograph of the sectional state of a dielectric layer (dielectric ceramic composition) produced by pre-addition of the first to fourth subcomponent materials in a Sample 3 in Example 1.
Figure 3:
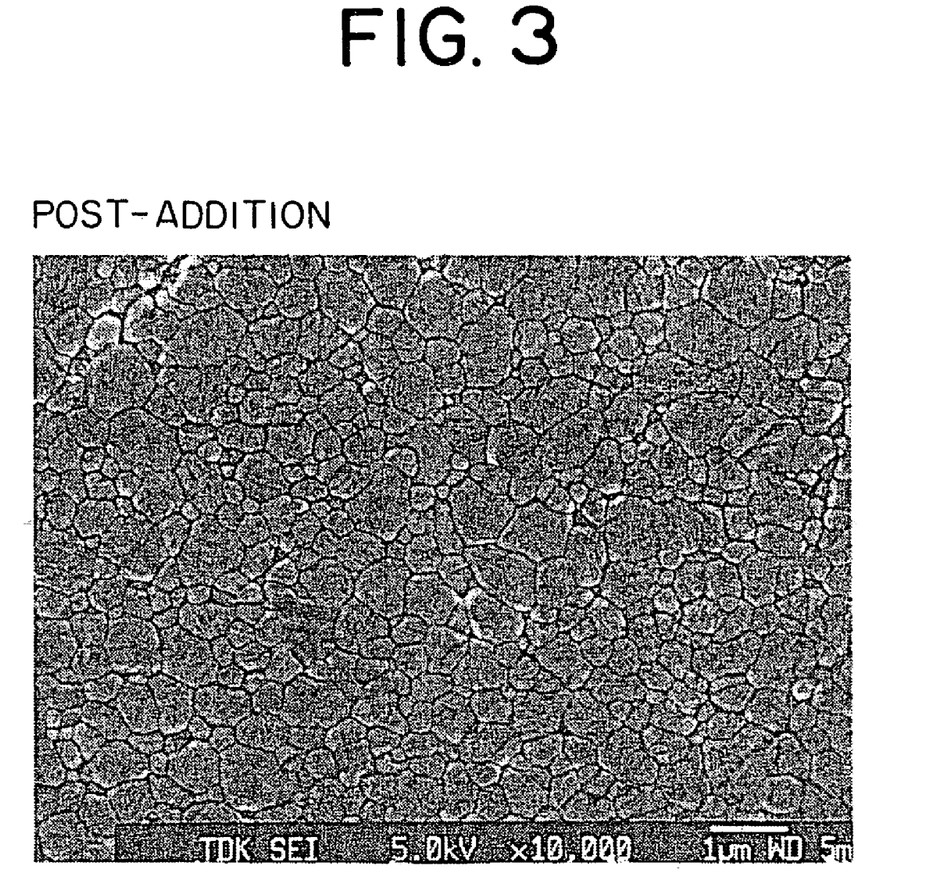
FIG. 3 is a SEM photograph of the sectional state of a dielectric layer (dielectric ceramic composition) produced by post-addition of the first to fourth subcomponent materials in a Sample 3 in Example 1.

The mean crystal grain size of the dielectric particles forming the dielectric layers was calculated by the cord method for each sample of the capacitor. The "cord method" is the method of calculating the mean crystal grain size of the dielectric particles from a SEM photograph. In this embodiment, the shapes of the dielectric particles are assumed to be spheres for convenience to calculate the particle size. Specifically, first, an SEM photograph showing the fine structure of the dielectric layers is used, any line is drawn on this SEM photograph, and the number of points intersecting grain boundaries present between dielectric particles which the line adjoins is found. Next, the number PL of intersecting points with the grain boundaries per unit length was calculated from the number of intersecting points found. Next, the obtained value of PL was used to calculate the code length L3. The code length L3 is found by 1/PL. Next, the mean crystal grain size of the dielectric particles was calculated from the value of L3 obtained multiplied by 1.5, that is, L3×1.5. Note that the field of vision of, the SEM photograph used was made 23 μm×30 μm. Five to six photographs were used for each sample, the particle sizes of these were calculated, and the mean values of these were made the mean crystal grain sizes. The results are shown in Table 1. These are similarly sought for the later explained Examples 2 and 3. Note that for reference, a SEM photograph of pre-addition by the composition of Sample 3 is shown in FIG. 2 and a SEM photograph of post-addition is shown in FIG. 3. As shown in FIG. 3, compared with FIG. 2, it can be confirmed that the dielectric particles are made finer. That is, the difference in the fine structure due to post-addition of the first to fourth subcomponents can be confirmed.

TABLE 1

| | Main component | | | | Pre-addition | | Post-addition | |
|---|---|---|---|---|---|---|---|---|
| | | | | | Mean crystal grain size | High temperature load lifetime | Mean crystal grain size | High temperature load lifetime |
| Sample | x | y | m | Composition | μm | hr | μm | hr |
| 1 | 0 | 0 | 1 | $CaZrO_3$ | 1.06 | 329 | 0.54 | 2273 |
| 2 | 1 | 0 | 1 | $SrZrO_3$ | 1.15 | 264 | 0.62 | 2001 |
| 3 | 0.3 | 0.3 | 1 | $(Ca_{0.7}Sr_{0.3})O\cdot(Zr_{0.7}Ti_{0.3})O_2$ | 1.27 | 177 | 0.69 | 1819 |
| 4 | 0.7 | 0.3 | 1 | $(Ca_{0.3}Sr_{0.7})O\cdot(Zr_{0.7}Ti_{0.3})O_2$ | 1.89 | 120 | 0.75 | 1682 |
| 5 | 0.3 | 0.7 | 1 | $(Ca_{0.7}Sr_{0.3})O\cdot(Zr_{0.3}Ti_{0.7})O_2$ | 2.18 | 77.8 | 0.81 | 1375 |
| 6 | 0.7 | 0.7 | 1 | $(Ca_{0.3}Sr_{0.7})O\cdot(Zr_{0.3}Ti_{0.7})O_2$ | 3.04 | 42.9 | 0.85 | 1266 |
| 7 | 0 | 1 | 1 | $CaTiO_3$ | 3.67 | 11.6 | 0.90 | 1149 |
| 8 | 1 | 1 | 1 | $SrTiO_3$ | 4.82 | 4.2 | 0.95 | 1023 |

Main component composition formula = $(Ca_{1-x}Sr_x)O)_m\cdot(Zr_{1-y}Ti_y)O_2$
Amount of addition with respect to 100 moles of main component
First subcomponent = $V_2O_5$, converted to $V_2O_5$, 0.5 mol %
Second subcomponent = $Al_2O_3$, converted to $Al_2O_3$, 0.25 mol %
Third subcomponent = $MnCO_3$, converted to Mn, 1 mol %
Fourth subcomponent = BCG, converted to BCG, 2 mol %

As shown in Table 1, it was confirmed that compared with pre-addition, in the case of post-addition, the mean crystal grain size of the dielectric particles of the dielectric layers was made finer to not more than 1 μm and as a result the high temperature load lifetime was strikingly improved.

Example 2

Except for changing the pre-addition and post-addition as shown in Table 2, the same procedure was followed as in Example 1 to prepare capacitor samples which were similarly evaluated for their characteristics. As a result, with each sample, tan δ was not more than 0.01%, the specific dielectric constant $\in$ was at least 45, and the specific resistance ρ was at least $1\times10^{12}$ Ω·cm. Regarding the temperature characteristic of the static capacitance as well, the rate of change of the static capacitance with respect to the temperature satisfied −3000 to 0 ppm/° C. The mean crystal grain size and the high temperature load lifetime are shown in Table 2. Note that the "pre-addition components" spoken of in this example means the subcomponent materials added to the starting materials for producing the main component material when producing the calcined material including the main component material. The "post-addition components" mean the subcomponent materials added to the calcined material including the main component material.

TABLE 2

| | | | Characteristics | |
|---|---|---|---|---|
| Sample | Pre-addition component | Post-addition component | Mean crystal grain size μm | High temperature load lifetime hr |
| 9 | 1st, 2nd, and 4th subcomponents | 3rd subcomponents | 0.77 | 1643 |
| 10 | 1st and 2nd subcomponents | 3rd and 4th subcomponents | 0.70 | 1810 |
| 11 | 1st and 4th subcomponents | 2nd and 3rd subcomponents | 0.75 | 1660 |
| 12 | 2nd and 4th subcomponents | 1st and 3rd subcomponents | 0.76 | 1655 |
| 13 | 4th subcomponent | 1st to 3rd subcomponents | 0.73 | 1801 |
| 3 | — | 1st to 4th subcomponents | 0.69 | 1819 |
| 14 | 1st to 3rd subcomponents | 4th subcomponent | 0.82 | 1366 |
| 15 | 1st and 3rd subcomponents | 2nd and 4th subcomponents | 0.80 | 1595 |
| 16 | 3rd subcomponent | 1st, 2nd, and 4th subcomponents | 0.77 | 1646 |
| 17 | 2nd to 3rd subcomponents | 1st and 4th subcomponents | 0.81 | 1593 |
| *18 | 1st, 3rd, and 4th subcomponents | 2nd subcomponent | 1.02 | 355 |
| *19 | 3rd and 4th subcomponents | 1st and 2nd subcomponents | 1.01 | 400 |
| *20 | 2nd to 4th subcomponents | 1st subcomponent | 1.25 | 186 |

Main component composition formula = $\{Ca_{1-x}Sr_x)O\}_m\cdot(Zr_{1-y}Ti_y)O_2$
x of main component = 0.3, y = 0.3, m = 1, composition = $(Ca_{0.7}Sr_{0.3})O\cdot(Zr_{0.7}Ti_{0.3})O_2$
Amount of addition with respect to 100 moles of main component
First subcomponent = $V_2O_5$, converted to $V_2O_5$, 0.05 mol %
Second subcomponent = $Al_2O_3$, converted to $Al_2O_3$, 0.25 mol %
Third subcomponent = $MnCO_3$, converted to Mn, 1 mol %
Fourth subcomponent = BCG, converted to BCG, 2 mol %
Sample numbers with asterisks are comparative example As shown in Table 2, when post-adding one or both of at least the third subcomponent materials and fourth subcomponent materials (Samples 9 to 17), it was confirmed that compared with Samples 18 to 20 without such addition, the mean crystal grain size of the dielectric particles of the dielectric layers was made finer to not more than 1 μm and as a result the high temperature load lifetime was strikingly improved.

Example 3

Except for changing the amounts of addition of the first to fourth subcomponents of the post-addition components as shown in. Table 3, the same procedure was followed as in Example 1 to prepare capacitor samples which were similarly evaluated for their characteristics. As a result, with each sample, tan δ was not more than 0.01%, the specific dielectric constant ∈ was at least 45, and the specific resistance ρ was at least $1 \times 10^{12}$ Ω·cm. Regarding the temperature characteristic of the static capacitance as well, the mean crystal grain size and the high temperature load lifetime are shown in Table 3. Note that the "post-addition component" spoken of in this example means subcomponent materials added to calcined material including the main component material.

subcomponent is too great (Sample 26), the high temperature load lifetime falls. If the second subcomponent is not contained (Sample 27), the high temperature load lifetime is not sufficient. If the amount of addition of the second subcomponent is too great (Sample 32), the high temperature load lifetime falls. If the third component is not contained (Sample 33), the high temperature load lifetime is not sufficient. If the amount of addition of the third subcomponent is too great (Sample 36), the high temperature load lifetime falls. If the fourth subcomponent is not contained (Sample 37), the high temperature load lifetime is not sufficient. If the amount of addition of the fourth subcomponent is too great (Sample 41), the high temperature load lifetime falls. As opposed to this, if the first to fourth subcomponents are suitably contained (Samples 3, 22 to 25, 28 to 31, 34 to 0.35, and 38 to 40), it could be confirmed that the specific dielectric constant and specific resistance are sufficient, no reduction occurs even in firing in a reducing atmosphere, the nickel internal electrode material is not oxidized, and a dielectric ceramic composition superior in reduction resistance is obtained. Further, it could be confirmed that the capacity-temperature characteristic is superior, the low frequency dielectric dispersion is suppressed (tan δ at 100 Hz and 160° C. is small) and the high temperature load lifetime is greatly improved.

TABLE 3

| | Amount of addition of post-addition component | | | | Characteristics | |
|---|---|---|---|---|---|---|
| Sample | 1st subcomp. $V_2O_3$ conversion (mol %) | 2nd subcomp. $Al_2O_3$ conversion (mol %) | 3rd subcomp. M conversion (mol %) | 4th subcomp. BCG conversion (mol %) | Mean crystal grain size μm | High temp. load lifetime hr |
| *21 | 0 | 0.25 | 1 | 2 | 0.70 | 0.8 |
| 3 | 0.05 | 0.25 | 1 | 2 | 0.69 | 1819 |
| 22 | 0.5 | 0.25 | 1 | 2 | 0.69 | 1922 |
| 23 | 1 | 0.25 | 1 | 2 | 0.69 | 1940 |
| 24 | 3 | 0.25 | 1 | 2 | 0.68 | 1955 |
| 25 | 5 | 0.25 | 1 | 2 | 0.67 | 1961 |
| *26 | 7 | 0.25 | 1 | 2 | 0.67 | 631 |
| *27 | 0.05 | 0 | 1 | 2 | 0.71 | 0.7 |
| 3 | 0.05 | 0.25 | 1 | 2 | 0.69 | 1819 |
| 28 | 0.05 | 0.5 | 1 | 2 | 0.69 | 1859 |
| 29 | 0.05 | 1 | 1 | 2 | 0.68 | 1922 |
| 30 | 0.05 | 5 | 1 | 2 | 0.67 | 2004 |
| 31 | 0.05 | 10 | 1 | 2 | 0.66 | 1213 |
| *32 | 0.05 | 15 | 1 | 2 | 0.65 | 479 |
| *33 | 0.05 | 0.25 | 0 | 2 | 0.70 | 814 |
| 3 | 0.05 | 0.25 | 1 | 2 | 0.69 | 1819 |
| 34 | 0.05 | 0.25 | 2 | 2 | 0.68 | 1647 |
| 35 | 0.05 | 0.25 | 4 | 2 | 0.67 | 1126 |
| *36 | 0.05 | 0.25 | 5 | 2 | 0.66 | 513 |
| *37 | 0.05 | 0.25 | 1 | 0 | 0.59 | 978 |
| 3 | 0.05 | 0.25 | 1 | 2 | 0.69 | 1819 |
| 38 | 0.05 | 0.25 | 1 | 5 | 0.71 | 1803 |
| 39 | 0.05 | 0.25 | 1 | 10 | 0.73 | 1711 |
| 40 | 0.05 | 0.25 | 1 | 15 | 0.76 | 1183 |
| *41 | 0.05 | 0.25 | 1 | 20 | 0.87 | 698 |

Main component composition formula = $(Ca_{1-x}Sr_x)O)_m \cdot (Zr_{1-y}Ti_y)O_2$
x of main component = 0.3, y = 0.3, m = 1, composition = $(Ca_{0.7}Sr_{0.3})O \cdot (Zr_{0.7}Ti_{0.3})O_2$
Amount of addition with respect to 100 moles of main component
First subcomponent = $V_2O_5$, converted to $V_2O_5$, 0.05 mol %
Second subcomponent = $Al_2O_3$, converted to $Al_2O_3$, 0.25 mol %
Third subcomponent = $MnCO_3$, converted to Mn, 1 mol %
Fourth subcomponent = BCG, converted to BCG, 2 mol %
Sample numbers with asterisks are comparative examples.

As shown in Table 3, if the first subcomponent is not contained (Sample 21), the high temperature load lifetime is extremely short. If the amount of addition of the first Note that in Table 3, even with an amount of post-addition of 0 (zero) mol % of the subcomponent (specifically, first subcomponent of Sample 21, second subcomponent of Sample 27, third subcomponent of Sample 33, and fourth subcomponent of Sample 37), the doubt arises that this may be added in advance, but in this embodiment, it is not added in advance. That it, in Table 3, an amount of addition of 0 (zero) mol % of the subcomponent means the subcomponent is not contained in the final composition.

What is claimed is:

1. A method of production of a dielectric ceramic composition having:
  a main component including a dielectric oxide expressed by a composition formula $\{(Ca_{1-x}Me_x)O\}_m \cdot (Zr_{1-y}Ti_y)O_2$, wherein a symbol Me showing the name of the element in the composition is at least one of Sr, Mg, and Ba, the symbols m, x, and y showing the molar ratio of the composition in the composition formula are $0.8 \leq m \leq 1.3$, $0 \leq x \leq 1.00$, $0 \leq y \leq 1.00$,
  a first subcomponent including a V oxide,
  a second subcomponent including an Al oxide,
  a third subcomponent including an Mn oxide, and
  a fourth subcomponent having $SiO_2$ as a main component and including an oxide including at least one type selected from Mo (where M is at least one type of element selected from Ba, Ca, Sr, and Mg), $Li_2O$, and $B_2O_3$,
  a ratio of the subcomponents with respect to 100 moles of the main component being:
  first subcomponent: 0 mole<first subcomponent<7 moles (however, value converting V oxide to $V_2O_5$),
  second subcomponent: 0 mole<second subcomponent<15 moles (however, value converting Al oxide to $Al_2O_3$),
  third subcomponent: 0 mole<third subcomponent<5 moles (however, value converting Mn oxide to Mn element),
  fourth subcomponent: 0 mole<fourth subcomponent<20 moles (however, value converted to oxide),
  the method of production of a dielectric ceramic composition having:
  a step of mixing at least part of other materials of subcomponents excluding at least one or both of the material of the third subcomponent and the material of the fourth subcomponent with starting materials prepared for obtaining the material of the main component so as to prepare a pre-reaction material,
  a step of causing the prepared pre-reaction material to react so as to obtain a reacted material, and
  a step of mixing with the obtained reacted material the materials of the subcomponents excluded when preparing the pre-reaction material to obtain a dielectric ceramic composition.

2. A method of production of a dielectric ceramic composition having:
  a main component including a dielectric oxide expressed by a composition formula $\{(Ca_{1-x}Me_x)O\}_m \cdot (Zr_{1-y}Ti_y)O_2$, wherein a symbol Me showing the name of the element in the composition is at least one of Sr, Mg, and Ba, the symbols m, x, and y showing the molar ratio of the composition in the composition formula are $0.8 \leq m \leq 1.3$, $0 \leq x \leq 1.00$, $0 \leq y \leq 1.00$,
  a first subcomponent including a V oxide,
  a second subcomponent including an Al oxide,
  a third subcomponent including an Mn oxide, and
  a fourth subcomponent having $SiO_2$ as a main component and including an oxide including at least one type selected from Mo (where M is at least one type of element selected from Ba, Ca, Sr, and Mg), $Li_2O$, and $B_2O_3$,
  a ratio of the subcomponents with respect to 100 moles of the main component being:
  first subcomponent: 6 mole<first subcomponent<7 moles (however, value converting V oxide to $V_2O_5$),
  second subcomponent: 0 mole<second subcomponent<15 moles (however, value converting Al oxide to $Al_2O_3$),
  third subcomponent: 0 mole<third subcomponent<5 moles (however, value converting Mn oxide to Mn element),
  fourth subcomponent: 0 mole<fourth subcomponent<20 moles (however, value converted to oxide),
  the method of production of a dielectric ceramic composition having:
  a step of mixing at least part of other materials of subcomponents excluding at least the material of the third subcomponent and the material of the fourth subcomponent with starting materials prepared for obtaining the material of the main component so as to prepare a pre-reaction material,
  a step of causing the prepared pre-reaction material to react so as to obtain a reacted material, and
  a step of mixing with the obtained reacted material the materials of the subcomponents excluded when preparing the pre-reaction material to obtain a dielectric ceramic composition.

3. A method of production of a dielectric ceramic composition having:
  a main component including a dielectric oxide expressed by a composition formula $\{(Ca_{1-x}Me_x)O\}_m \cdot (Zr_{1-y}Ti_y)O_2$, wherein a symbol Me showing the name of the element in the composition is at least one of Sr, Mg, and Ba, the symbols m, x, and y showing the molar ratio of the composition in the composition formula are $0.8 \leq m \leq 1.3$, $0 \leq x \leq 1.00$, $0 \leq y \leq 1.00$,
  a first subcomponent including a V oxide,
  a second subcomponent including an Al oxide,
  a third subcomponent including an Mn oxide, and
  a fourth subcomponent having $SiO_2$ as a main component and including an oxide including at least one type selected from Mo (where M is at least one type of element selected from Ba, Ca, Sr, and Mg), $Li_2O$, and $B_2O_3$,
  a ratio or the subcomponents with respect to 100 moles of the main component being:
  first subcomponent: 0 mole<first subcomponent<7 moles (however, value converting V oxide to $V_2O_5$),
  second subcomponent: 0 mole<second subcomponent<15 moles (however, value converting Al oxide to $Al_2O_3$),
  third subcomponent: 0 mole<third subcomponent<5 moles (however, value converting Mn oxide to Mn element),
  fourth subcomponent: 0 mole<fourth subcomponent<20 moles (however, value converted to oxide),
  the method of production of a dielectric ceramic composition having:
  a step of mixing starting materials, excluding the materials of the first to fourth subcomponents, prepared for obtaining the material of the main component so as to prepare a pre-reaction material,
  a step of causing the prepared pre-reaction material to react so as to obtain a reacted material, and
  a step of mixing with the obtained reacted material the materials of the first to fourth subcomponents excluded when preparing the pre-reaction material to obtain a dielectric ceramic composition.

4. The method of production of a dielectric ceramic composition as set forth in claim 1, further including a compound oxide expressed by the composition formula $\{(Ba_x, Ca_{1-z})O\}_v SiO_2$ where the symbols z and v showing the molar ratio in the composition formula are in the relation of $0 \leq z \leq 1$ and $0.5 \leq v \leq 4.0$.

5. The method of production of a dielectric ceramic composition as set forth in claim 2, further including a compound oxide expressed by the composition formula $\{(Ba_z, Ca_{1-z})O\}_v SiO_2$ where the symbols z and v showing the molar ratio in the composition formula are in the relation of $0 \leq z \leq 1$ and $0.5 \leq v \leq 4.0$.

6. The method of production of a dielectric ceramic composition asset forth in claim 3, further including a compound oxide expressed by the composition formula $\{(Ba_z, Ca_{1-z})O\}_v SiO_2$ where the symbols z and v showing the molar ratio in the composition formula are in the relation of $0 \leq z \leq 1$ and $0.5 \leq v \leq 4.0$.

7. The method of production of a dielectric ceramic composition asset forth in claim 1, using a solid phase method as the method of causing a reaction of the pre-reaction material.

8. The method of production of a dielectric ceramic composition as set forth in claim 2, using a solid phase method as the method of causing a reaction of the pre-reaction material.

9. The method of production of a dielectric ceramic composition as, set forth in claim 3, using a solid phase method as the method of causing a reaction of the pre-reaction material.

10. The method of production of a dielectric ceramic composition as set forth in claim 1, further having the step of firing the obtained dielectric ceramic composition at 1000 to 1400° C.

11. The method of production of a dielectric ceramic composition as set forth in claim 2, further having the step of firing the obtained dielectric ceramic composition at 1000 to 1400° C.

12. The method of production of a dielectric ceramic composition as set forth in claim 3, further having the step of firing the obtained dielectric ceramic composition at 1000 to 1400° C.

13. A dielectric ceramic composition having dielectric particles having a mean crystal grain size of not more than 1 μm obtained by the method set forth in claim 1.

14. A dielectric ceramic composition hating dielectric particles having a mean crystal grain size of not more than 1 μm obtained by the method set forth in claim 2.

15. A dielectric ceramic composition having dielectric particles having a mean crystal grain size of not more than 1 μm obtained by the method set forth in claim 3.

16. An electronic device having dielectric layers comprised by the dielectric ceramic composition set forth in claim 13.

17. An electronic device having dielectric layers comprised by the dielectric ceramic composition set forth in claim 14.

18. An electronic device having dielectric layers comprised by the dielectric ceramic composition set forth in claim 15.

19. A multilayer ceramic capacitor having dielectric layers comprised by the dielectric ceramic composition set forth in claim 13 and internal electrode layers having a base metal as its main component alternately stacked.

20. A multilayer ceramic capacitor having dielectric layers comprised by the dielectric ceramic composition set forth in claim 14 and internal electrode layers having a base metal as its main component alternately stacked.

21. A multilayer ceramic capacitor having dielectric layers comprised by the dielectric ceramic composition set forth in claim 15 and internal electrode layers having a base metal as its main component alternately stacked.

* * * * *